UNITED STATES PATENT OFFICE.

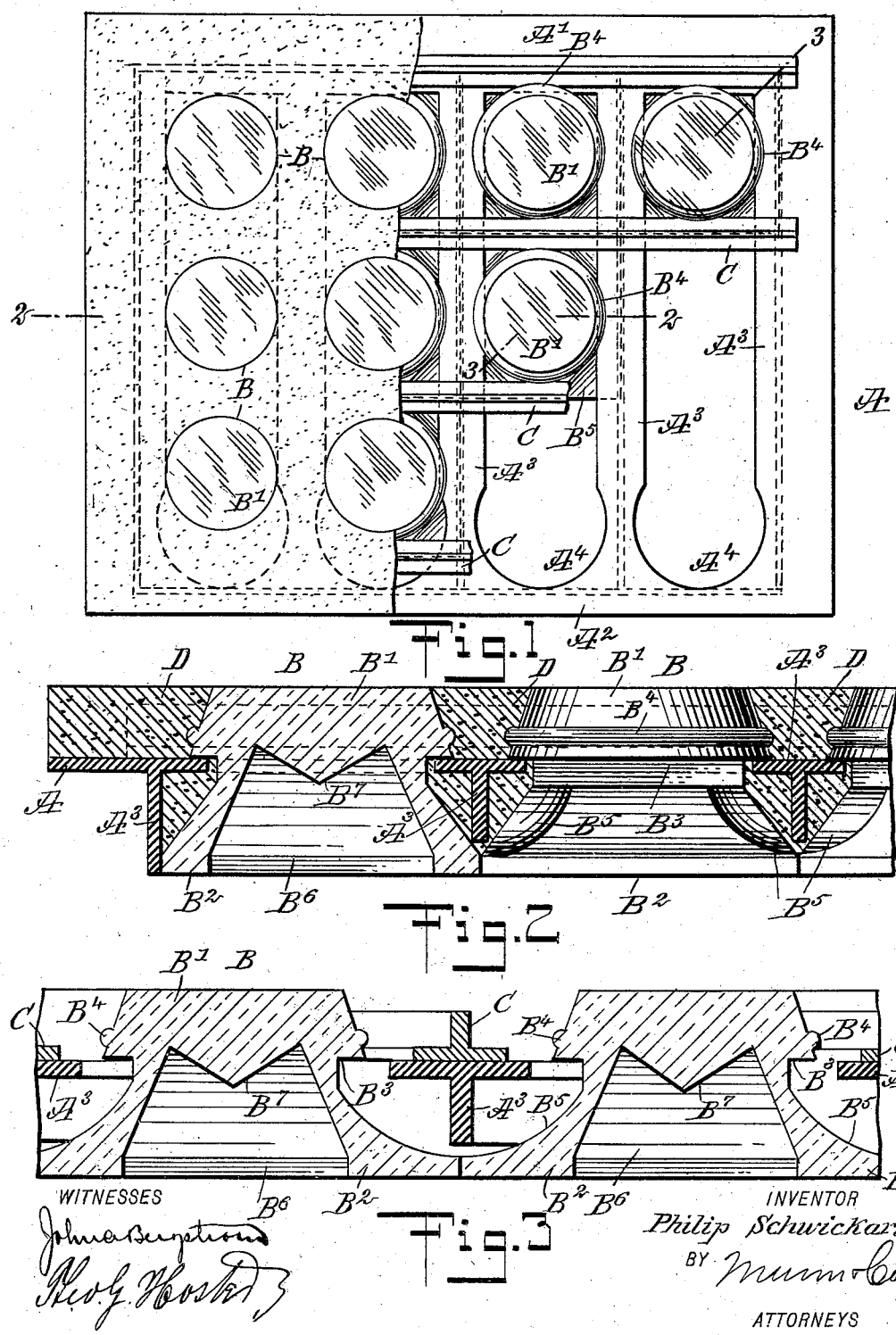

PHILIP SCHWICKART, OF NEW YORK, N. Y.

BUILDING-LIGHT.

No. 889,724.

Specification of Letters Patent.

Patented June 2, 1908.

Application filed August 2, 1907. Serial No. 386,788.

*To all whom it may concern:*

Be it known that I, PHILIP SCHWICKART, a citizen of the United States, and a resident of the city of New York, borough of Brooklyn, in the county of Kings and State of New York, have invented a new and Improved Building-Light, of which the following is a full, clear, and exact description.

The object of the invention is to provide a new and improved building light for use on vaults, sky lights, floors, etc., and which is completely water and moisture-proof, and arranged to distribute the rays of light uniformly over a large space, and to permit of conveniently placing the lights in position in the supporting frame and securely locking the same therein.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a plan view of the improvement, parts being broken out; Fig. 2 is a sectional side elevation of the same on the line 2—2 of Fig. 1, and Fig. 3 is a cross section of the same, on the line 3—3 of Fig. 1.

The metallic main frame or support A is preferably formed of front and rear bars A', A², integrally connected with each other by spaced cross bars A³ of T-shape, and having cut out portions A⁴ adjacent to the front bar A², to allow of conveniently placing the glass lights or prisms B in position on the said main frame A, as hereinafter more fully explained.

Each of the glass lights or prisms B consists of a conical top or upper portion B' and a lower portion B² of pyramidal shape, the upper end of the lower portions B² fitting between the adjacent cross bars A³ and forming with the base of the upper conical portion shoulders B³ adapted to rest on the adjacent cross bars A³, as plainly indicated in Figs. 1 and 3.

The bases of the lower portions B² of the glass lights B project below the bars A³ of the frame A and are preferably square, and the sides of the adjacent bases abut one against the other, so that the bottom surface of the structure is of glass of unbroken continuity.

The conical top portions B' of the glass lights B are provided with annular shoulders or beads B⁴ adapted to rest at the front and rear on supporting bars C laid on top of the frame A and extending at right angles to the bars A³, so that each glass light B is supported on the sides by the bars A³, and at the front and rear by the bars C. The bars C are preferably of inverted T-shape (see Fig. 3) and rest loosely on top of the main frame A.

The corners B⁵ of the lower portion B² of each glass light B are chamfered, to permit cement or a similar plastic binding substance D to pass down between the adjacent bars C and A³, with a view to completely embed the cross bars A³, and to fill the spaces between the sides of the glass lights B.

The lower portion B² of each glass light B is preferably provided with a recess B⁶, the top B⁷ of which may be conical or ornamented, if desired.

In placing the building light in position, the main frame A is first set in place and then the glass lights B are introduced from the bottom upward through the cut-out portions A⁴, which are sufficiently large to permit the conical portion B' of each glass light B. The glass light B is now slipped forward between adjacent bars A³ with the shoulder B³ resting on top of the adjacent bars A³, and in a similar manner the several glass lights are introduced and pushed in place, one alongside the other, so that the sides of the square bases fit one against the other, to produce an entire surface of glass of unbroken continuity. When the lights have been placed in position on the main frame A, the bars C can be pushed in from the ends of the main frame A, and then the cement or other plastic binding substance D is poured down between adjacent lights, so that the cement completely fills the spaces between the adjacent lights B, and at the same time completely embeds both the supporting bars A³ and C.

By the arrangement described an exceedingly strong and durable building light is produced, which is completely water and moisture-proof, and by its unbroken glass surface at the bottom is capable of distributing the rays of light uniformly and over a large area.

The building light shown and described can be cheaply manufactured and quickly set up, and used for various purposes such as covers for vaults, sky lights, floors and the like.

Having thus described my invention, I claim as new and desire to secure by Letters Patent:

1. A building light, comprising a support formed of sets of superimposed spaced bars at right angles one to the other, glass lights having shoulders for engaging each set of bars, and a plastic binding material filling the spaces between the glass lights embedding the said bars.

2. A building light, comprising a support, glass lights having square lower ends supported on the said support and projecting above and below the same, said square ends contacting with the adjacent lights to form a continuous glass surface and a binding material in which the support is completely embedded and which fills the spaces between the sides of the lights.

3. A glass light having a conical upper portion and a square bottom portion, forming with the said upper portion, a supporting shoulder, and a second supporting shoulder on the conical upper portion.

4. A glass light having a conical upper portion and a square bottom portion, forming with the said upper portion a supporting shoulder, and a second supporting shoulder on the conical upper portion, the corners of the square bottom portions being chamfered.

5. A glass light having a conical upper portion and a square bottom portion, forming with the said upper portion a supporting shoulder, and a second supporting shoulder on the conical upper portion, the corners of the square bottom portions being chamfered and the under side of the bottom portion being recessed.

In testimony whereof I have signed my name to this specification in the presence of two subscribing witnesses.

PHILIP SCHWICKART.

Witnesses:
THEO. G. HOSTER,
JOHN P. DAVIS.